Patented Dec. 20, 1938

2,140,547

UNITED STATES PATENT OFFICE 2,140,547

CHLORINATION OF ETHANE

John H. Reilly, Midland, Mich., assignor to The Dow Chemical Company, Midland, Mich., a corporation of Michigan No Drawing. Application August 26, 1936, Serial No. 98,095

2 Claims. (Cl. 260—656)

This invention relates to processes for the chlorination of ethane, and, more particularly, to a process for chlorinating ethane to produce principally mono-chlorinated compounds.

It has been thought heretofore that, in the chlorination of ethane in either the liquid or vapor phase, the concentration of mono-chloro compounds in the product must not be allowed to exceed 20–30 per cent, else the formation of poly-chlorinated compounds in excessive amount begins. It has therefore been considered necessary in batch processes for chlorinating ethane to separate the mono-chlorinated compounds from the reaction mixture when the concentration thereof in the mixture reaches the range above set forth; and in continuous processes to limit the amount of chlorine admixed with the ethane so that there is a major portion of un-chlorinated ethane in the exit gases.

It is, therefore, an object of the present invention to provide a process whereby sufficient chlorine can be admixed with ethane to chlorinate the entire quantity thereof at a single treatment, and at the same time obtain principally mono-chloro-hydrocarbons. It is a further object of the invention to provide a process whereby ethane can be chlorinated directly to produce ethyl chloride as the principal product of the reaction, along with substantial amounts of vinyl chloride.

I have now found that ethane can be admixed with chlorine in approximately equimolecular proportions, and the gas mixture contacted with a bath of molten metal chlorides maintained at a temperature above about 250° C., but below the decomposition point of ethyl chloride, to obtain a product containing a preponderating proportion of ethyl chloride and vinyl chloride. The composition of the molten metal chloride bath must be such as to obtain salt mixtures which are liquid at the above temperatures, preferably having a melting point at least as low as 200° C. Mixtures of the chlorides of aluminum, magnesium, potassium, iron, sodium, copper, bismuth, and zinc are useful when compounded in the proper proportions to give a suitable melting point. The eutectic obtained by mixing 60 parts by weight of aluminum chloride, 30 parts of sodium chloride, and 10 parts of ferric chloride is entirely suitable for my purpose. This composition has a melting point of approximately 150° C. and a boiling point above 1000° C. Copper chloride may be substituted for ferric chloride in said mixture.

The ethane and chlorine may be preheated separately or after admixture prior to contacting with the molten salt bath, but such preheating is not necessary to obtain satisfactory results. The type of reaction vessel in which the ethane and chlorine are contacted with the molten metal chlorides is capable of considerable variation and does not form part of the subject matter of this invention. The reaction product evolved from the molten salt bath is cooled to condense the chlorinated products, and any excess chlorine therein present can be re-cycled in the process. The product so obtained can then readily be separated by fractional distillation. The total yield of mono-chloro compounds obtained is generally about 70 per cent by weight, based on the ethane reacted, and the percentage of ethyl chloride among the mono-chloro compounds is generally above 60 per cent by weight, the balance being chiefly vinyl chloride, with small amounts of methyl chloride.

The following example illustrates the practice of my invention:

17.7 pounds of aluminum chloride, 6.4 pounds of sodium chloride, and 1.0 pound of copper chloride were melted together in a suitable reactor and heated to a temperature of approximately 400° C. Into this molten salt bath was then passed a mixture of ethane and chlorine in the ratio of one part by weight of ethane to three parts by weight of chlorine, at the rate of 3.6 pounds per hour. The vapors continuously evolved from the bath were cooled to condense the chlorinated product therefrom. The process was operated continuously over a period of several hours, the product collected and fractionally distilled. Of the crude product 45.9 per cent by weight was ethyl chloride, 21.9 per cent by weight was vinyl chloride, and 3.7 per cent by weight was methyl chloride. Thus, the percentage of ethane converted the mono-chloro compounds amounted to 71.5 per cent. The balance of the product was polychlorinated compounds such as dichloroethane, tetrachloroethylene, trichloroethane, etc.

Another suitable mixture of molten metal chlorides which may be employed in carrying out my invention can be prepared by melting together 46 per cent by weight of aluminum chloride, 46 per cent of sodium chloride, and 8 per cent of bismuth chloride. Ordinarily the bath should be maintained between about 250° C. and about 450° C. The proportions of chlorine to ethane may be varied between about 2.4 and about 3.5 parts of chlorine per part of ethane, all by weight. If the chlorine ratio is much greater than 3.5 parts of chlorine per part of ethane, the yield of monochlorinated products is decreased. The ethane and chlorine need not be pure, chlorine from electrolytic cells, which contains only 80-85 per cent by weight of chlorine, being suitable for use.

My invention provides a method for the direct chlorination of ethane in which the major portion of the heat necessary to maintain the molten salt bath at elevated temperatures is supplied from the exothermic chlorination reaction. A very high through-put of reactants for the size of the apparatus employed can be maintained, since the reacting gases can be put into the bath at any rate below that at which the molten bath will be blown out of the reactor. The catalytic efficiency of the salt bath to promote the substitution reaction is substantially unchanged over long periods of time.

Other mode of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a process of chlorinating ethane, the step which consists in subjecting a gaseous mixture containing ethane and chlorine, in the ratio of between about 2.4 and about 3.5 parts by weight of chlorine per part of ethane, to intimate contact with a liquid mass of metal chlorides maintained at a temperature above about 250° C. but below the decomposition temperature of the ethyl chloride.

2. In a process for the conjoint production of ethyl chloride and vinyl chloride, the step which consists in passing a gaseous mixture containing ethane and chlorine, in the ratio of between about 2.4 and about 3.5 parts by weight of chlorine per part of ethane, into a liquid mass comprising essentially a metal chloride and maintained at a temperature above about 250° C. but below the decomposition temperature of the ethyl chloride.

JOHN H. REILLY.